United States Patent [19]
Prince et al.

[11] Patent Number: 6,106,729
[45] Date of Patent: Aug. 22, 2000

[54] AERATION ASSEMBLY FOR DAM SITES

[76] Inventors: Jack E. Prince, 3355 Legion Dr., Kerrville, Tex. 78208; William H. Mullins, 230 W. Kings Hwy., San Antonio, Tex. 78212

[21] Appl. No.: 09/234,568

[22] Filed: Jan. 20, 1999

[51] Int. Cl.⁷ .................. C02F 7/00; E02B 8/06
[52] U.S. Cl. .................. 210/747; 210/758; 210/170; 210/199; 405/108
[58] Field of Search .................. 210/620, 747, 210/758, 170, 199; 405/108, 110, 118, 124

[56] References Cited

U.S. PATENT DOCUMENTS

| | | | |
|---|---|---|---|
| 3,854,291 | 12/1974 | Perkins | 210/170 |
| 4,343,696 | 8/1982 | Hung | 210/170 |
| 4,386,121 | 5/1983 | Vasiliev et al. | 405/108 |
| 4,702,830 | 10/1987 | Makino et al. | 210/170 |
| 4,828,696 | 5/1989 | Makino et al. | 210/170 |
| 4,857,185 | 8/1989 | Desjardins | 210/170 |
| 5,462,657 | 10/1995 | Rizk et al. | 210/199 |
| 5,514,285 | 5/1996 | Risk et al. | 210/747 |

*Primary Examiner*—Thomas G. Wyse
*Attorney, Agent, or Firm*—Christopher L. Makay

[57] ABSTRACT

An apparatus for aerating water contained at a dam site includes a force main pipe for receiving water from a dam site water reservoir therethrough and a dam aeration assembly in communication with the force main pipe. The dam aeration assembly, via an array of aerators, aerates water delivered from the force main pipe and introduces the aerated water into a dam site discharge waterway.

23 Claims, 1 Drawing Sheet

AERATION ASSEMBLY FOR DAM SITES

BACKGROUND OF THE INVENTION

1. Field of the Invention

The present invention generally relates to fluid aeration assemblies and, more particularly, but not by way of limitation, to an aeration assembly for facilitating the dissolution of oxygen into water that is discharged from a dam site without requiring supplemental power or moving parts for operation.

2. Description of the Related Art

Typically, a dam site features a water reservoir, a dam structure, and a discharge waterway whereby water from the reservoir passes through the dam structure and is introduced into the discharge waterway. Water retained in a reservoir often becomes devoid of oxygen due to stagnation and other contributing factors. Once introduced into a discharge waterway, this anaerobic water is carried downstream creating potentially hazardous environmental effects, especially to wildlife. As such, federal regulations require that about six to eight parts per million of oxygen must be added to water discharged into a waterway.

Due in part to these regulations, there is an immediate and increasing need to oxygenate water discharged from dam sites. Today's aeration systems, however, do not satisfy this need. Ideally, aeration systems at a dam site project must run continuously so that oxygen can be added to vast amounts of water. Because such aeration systems must run continuously, frequent repair and maintenance can be potentially detrimental to an entire dam site project. Current aeration systems, especially those with air compressors powered by electricity, feature many moving parts that are subject to failure due to such factors as wear, corrosion, and fatigue. Moreover, current aeration systems often require a separate or "supplemental" source of power for operation. Thus, if introduced to a dam site project, a current aeration system's power costs alone could prove to be too costly for a successful project.

Accordingly, there is a long felt need for an aeration assembly that permits oxygen to be dissolved into water discharged from a dam site without requiring supplemental power or moving parts for operation.

SUMMARY OF THE INVENTION

In accordance with the present invention, an apparatus for aerating water contained at a dam site includes a force main pipe for receiving water from a dam site water reservoir therethrough and a dam aeration assembly in communication with the force main pipe. The dam aeration assembly aerates water delivered from the force main pipe and introduces the aerated water into a dam site discharge waterway. In particular, the dam aeration assembly includes an array of aerators for aerating water. The dam aeration assembly may include an outlet pipe whereby water flows from the array of aerators to the discharge waterway through the outlet pipe. Additionally, the outlet pipe may include a spillway for discharging overflow within the dam aeration assembly from the force main pipe to the discharge waterway.

Furthermore, the dam aeration assembly includes a pipe inlet assembly coupled with the force main pipe and a header assembly coupled with the pipe inlet assembly at one end and coupled with the array of aerators at an opposing end such that water is directed from the force main pipe through the pipe inlet assembly to the header assembly. The pipe inlet assembly includes a first water delivery pipe in communication with the force main pipe, a directional valve for regulating fluid pressure between the force main pipe and the first water delivery pipe, an elbow pipe in communication with the first water delivery pipe, and a second water delivery pipe in communication with the elbow pipe. Accordingly, water is diverted from the force main pipe, through the directional valve, the first water delivery pipe, and the elbow pipe to the second water delivery pipe.

The header assembly is linked with the pipe inlet assembly via a header pipe. The header assembly includes the header pipe linked with the second water delivery pipe, a header valve in cooperative engagement with the header pipe, a leader pipe linked with the header valve and with the array of aerators. As such, water is delivered from the pipe inlet assembly to the header pipe, across the header valve and leader pipe, and enters the array of aerators via the leader pipe.

It is critical that the dam aeration assembly maintains a water pressure between about twenty and about twenty-five pounds per square inch for inducing optimal conditions for aerating the water. Two embodiments of the present invention are contemplated for maintaining this pressure range. In a first embodiment, the force main pipe extends generally downwardly from a dam structure of the dam site toward the discharge waterway to provide the requisite pressure range. In a second embodiment, the force main pipe is positioned along the dam structure in direct communication with the water reservoir to provide the requisite pressure range. For the second embodiment, a pump may be provided between the force main pipe and the water reservoir for drawing water from the water reservoir to the force main pipe.

In accordance with the present invention, a method for aerating water at dam sites includes advancing water from a dam site water reservoir through a force main pipe in communication with the water reservoir. The water is advanced from the force main pipe through a dam aeration assembly linked with the force main pipe to aerate the water. In particular, water is delivered from the force main pipe, across a pipe inlet assembly of the dam aeration assembly to a header assembly of the dam aeration assembly. The water is aerated via an array of aerators in communication with the header assembly and is discharged by the dam aeration assembly into a dam site discharge waterway.

The method may further include generating a desired fluid pressure for inducing optimal conditions for aerating the water, whereby the force main pipe extends generally downwardly from the dam structure toward the discharge waterway to generate the desired fluid pressure. The method may further include generating a desired fluid pressure for inducing optimal conditions for aerating the water, whereby the force main pipe is positioned along the dam structure in direct communication with the reservoir to generate the desired fluid pressure.

It is therefore an object of the present invention to provide an aeration assembly for facilitating the dissolution of oxygen into water that is discharged from a dam site without requiring supplemental power or moving parts for operation.

Still other objects, features, and advantages of the present invention will become evident to those skilled in the art in light of the following.

DETAILED DESCRIPTION OF THE PREFERRED EMBODIMENT

Figure 1:
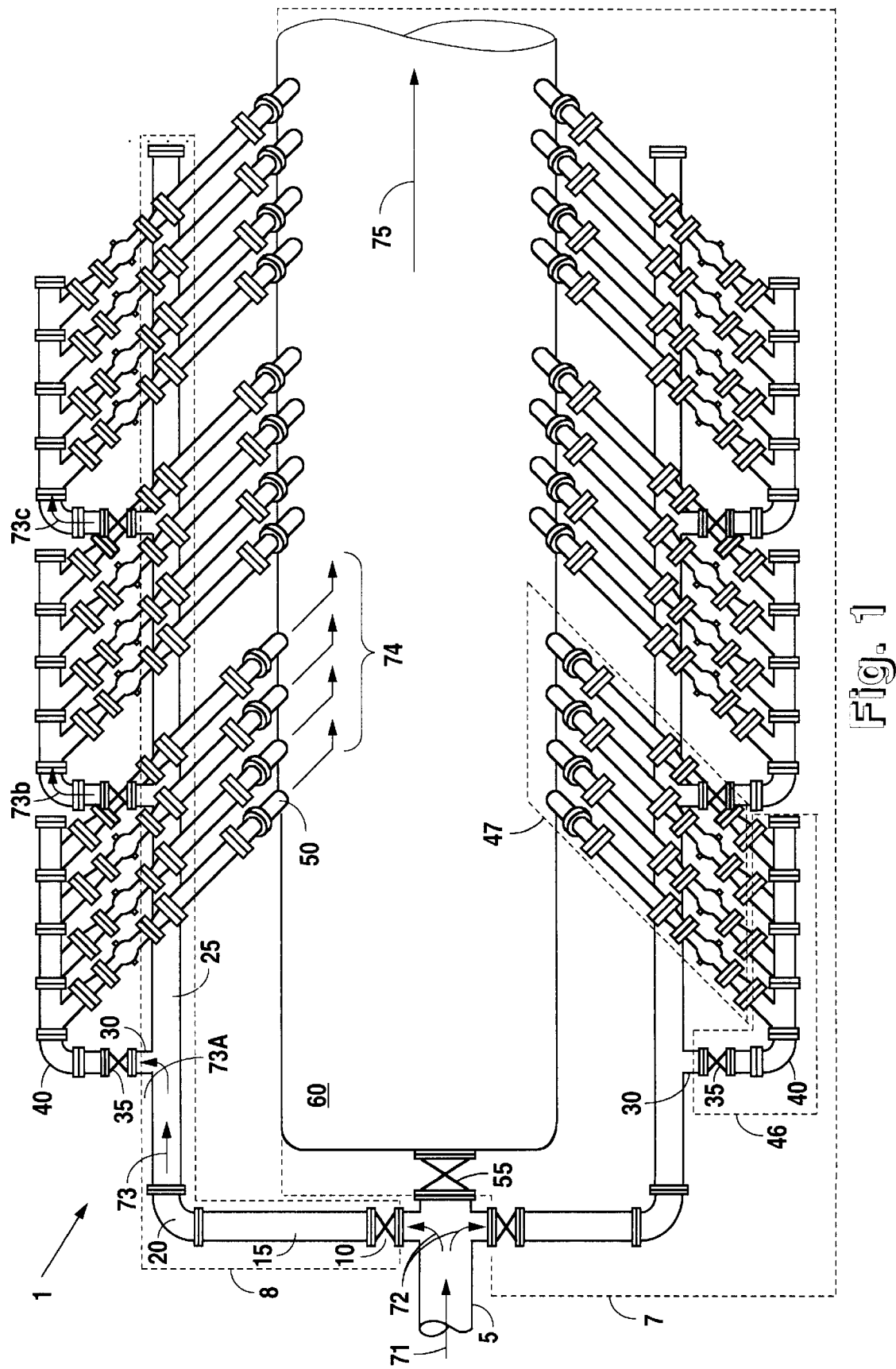
FIG. 1 is a top elevation view illustrating an aeration assembly according to the preferred embodiment.

As required, detailed embodiments of the present invention are disclosed herein; however, it is to be understood that the disclosed embodiments are merely exemplary of the invention, which may be embodied in various forms. The figures are not necessarily to scale, and some features may be exaggerated to show details of particular components or steps.

As illustrated in FIG. 1, aeration assembly 1 includes a dam aeration assembly 7 and a force main pipe 5 linked with the dam aeration assembly 7. In this preferred embodiment, depicted in FIG. 1, two dam aeration assemblies are operatively linked with one another although those skilled in the art will recognize that any number of dam aeration assemblies which will sufficiently add oxygen to discharged dam water may be utilized. The dam aeration assembly 7 includes an array of aerators 47 in communication with the force main pipe 5. The force main pipe 5 is operatively linked with a water reservoir at a dam site and receives therein water from the reservoir. As the water level at a dam site rises and falls, the aeration assembly 1 actively responds to variations in water pressure and rate of flow therethrough so that the array of aerators 47 may operate efficiently. Ultimately, each aerator from the array of aerators 47 oxygenates water discharged from a dam site.

It is essential that the array of aerators 47 maintain an optimum water pressure level between about twenty and twenty-five pounds per square inch as water enters each aerator so that each aerator can efficiently discharge about eight to ten milligrams per liter of dissolved oxygen into a waterway. Two embodiments of the present invention are contemplated for maintaining this pressure range although those skilled in the art may recognize other suitable and equivalent embodiments.

In the first embodiment, force main pipe 5 extends generally downward from behind the crest of a dam structure so as to subject the water flowing therein to the acceleration of gravity and, thus, providing a desired water pressure to operate the array of aerators 47. Given the critical pressure range above, between about twenty and twenty-five pounds per square inch, and allowing for usual head losses associated with water pipes, about fifty to sixty-two feet of water is needed to accelerate the water within the force main pipe 5 with respect to gravity. In addition, because water levels at a dam rise and fall continuously, at least twenty-five feet of additional head may be provided to ensure that the desired water pressure is met. As such, because gravity accelerates water within force main pipe 5, no supplemental power is required to pump water through the aeration assembly 1.

In the second embodiment, force main pipe 5 is positioned along a dam structure in direct communication with a water reservoir. A pump (not shown) is provided to draw water from the reservoir to the force main pipe 5. Because water pressure along a dam structure is often too high for efficiently operating the array of aerators 47, valves are provided throughout the aeration assembly 1, as discussed below, to regulate the water pressure pumped therethrough.

As shown in FIG. 1, the force main pipe 5 is operatively linked to an outlet pipe 60 that facilitates the discharge of water into a nearby waterway, such as a stream or river. Outlet pipe 60 performs two distinct functions. First, outlet pipe 60 acts as a collective outlet for oxygenated water treated by the array of aerators 47. Second, outlet pipe 60 acts as a "spillway" that allows overflow within the aeration assembly 1 to pass directly through and discharge into a nearby waterway, especially when the height of water at a dam reservoir is at dangerous levels. In particular, a throttle valve 55 is provided between the outlet pipe 60 and the force main pipe 5 to regulate the flow of water directly into outlet pipe 60. Accordingly, when in a generally open position, throttle valve 55 provides for a spillway. When in a generally closed position, the preferred operative position for the aeration assembly 1, throttle valve 55 diverts the flow of water within the force main pipe 5 into two opposing directions to channel water to the array of aerators 47.

As assembled, one dam aeration assembly for each direction, each dam aeration assembly 7, and its respective array of aerators 47 is structurally identical to that of the opposing direction. Although FIG. 1 shows two directions, those skilled in the art will recognize that any number of directions and arrays of aerators which sufficiently add oxygen to discharged dam water may be utilized.

Specifically, water is diverted from the force main pipe 5 to a pipe inlet assembly 8. In this preferred embodiment, each pipe inlet assembly 8 includes a first water delivery pipe 15 of constant diameter. Water thus flows from the force main pipe 5 to the first water delivery pipe 15 via a directional valve 10. Directional valve 10 is positioned between the force main pipe 5 and the first water delivery pipe 15 to regulate water pressure as required by the array of aerators 47. The first water delivery pipe 15 is connected to an elbow pipe 20 using any suitable connecting means. Elbow pipe 20, in turn, connects to a second water delivery pipe 25 using any suitable connecting means. The second water delivery pipe 25 directs water to each header assembly 46.

FIG. 1 shows three header assemblies cooperatively linked with one another, in series, for each of the two directions through which water travels toward the arrays of aerators. It should be emphasized that those skilled in the art will recognize that any number of header assemblies, which sufficiently add oxygen to discharged dam water, may be utilized. In particular, each header assembly 46 includes a header pipe 30 that is linked with the second water delivery pipe 25, a header valve 35 in cooperative engagement with header pipe 30, a leader pipe 40 linked with header valve 35 and with the array of aerators 47. Accordingly, the array of aerators 47 is maintained in cooperative engagement with the leader pipe 40. Although FIG. 1 shows four aerators for each array of aerators, those skilled in the art will recognize that any number of aerators for each array which sufficiently add oxygen to discharged dam water may be utilized.

Each header assembly 46 is connected in series along the second water delivery pipe 25 to accommodate varying amounts of water that flow across the second water delivery pipe 25. In particular, each header assembly 46 operates sequentially depending on volume of water delivered from the dam site reservoir by the second water delivery pipe 25. Thus, when one header assembly has reached its operational capacity and is full, water will continue to flow further along the second water delivery pipe until it has reached the first available header assembly.

The header valve 35 regulates water pressure so that it is suitable for operation by the array of aerators 47. The leader pipe 40 is provided to distribute water from the second water delivery pipe 25 to each aerator from the array of aerators 47. Each aerator is preferably an aerator sold under the trade name HYDRO-VAC by Hydro-Vac, Inc. of Kerrville, Tex. In particular, a HYDRO-VAC aerator utilizes the principle of a Venturi tube to introduce air into water in the form of microscopic bubbles so that oxygen will not easily escape from the water thereafter. The HYDRO-VAC requires no supplemental power and features no moving mechanical parts. Thus, the HYDRO-VAC costs relatively less to operate, repair, and maintain than other aerators.

Each aerator outlet 50 is in communication with outlet pipe 60 so that water oxygenated by the array of aerators 47 is discharged into a nearby waterway. Preferably, to maximize the oxygenating benefit, outlet pipe 60 should extend, coaxially, about one hundred feet before discharging treated water into a waterway.

In operation, water is delivered from a reservoir of a dam site to the aeration assembly 1 through a force main pipe 5, as indicated by directional arrow 71 in FIG. 1. Directional arrows 72 depict water diverted from a force main pipe 5 into two different, but structurally identical, directions. Water is allowed to pass from the force main pipe 5 to a first water delivery pipe 15 via a directional valve 10. Water continues to flow from the first water delivery pipe 15 through an elbow pipe 20 to a second water delivery pipe 25.

Directional arrows 73 show a sequential flow of water, from 73a toward 73c, along the second water delivery pipe 25 until water is allowed to enter a first available header assembly 46, specifically shown as either 73a, 73b or 73c. Water flows from the second water delivery pipe 25 through a header pipe 30 from the first available header assembly 46. Water flows from the header pipe 30, across a header valve 35, and through a leader pipe 40. Leader pipe 40 thus distributes water to each aerator from the array of aerators 47. Directional arrows 74 show an outward flow of water from each aerator outlet 50 into an outlet pipe 60. Directional arrow 75 indicates the direction of water flow across outlet pipe 60 and, ultimately, toward a discharge waterway.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

We claim:

1. An apparatus for aerating water contained at a dam site including a water reservoir, a dam structure, and a discharge waterway whereby water from the water reservoir passes through the dam structure and is introduced to the discharge waterway, comprising:

a force main pipe for receiving water from the water reservoir therethrough; and a dam aeration assembly in communication with the force main pipe for aerating water delivered from the force main pipe and introducing the aerated water into the discharge waterway.

2. The apparatus according to claim 1, wherein the dam aeration assembly comprises an array of aerators.

3. The apparatus according to claim 1, wherein the force main pipe extends generally downwardly from the dam structure toward the discharge waterway, thereby providing a desired fluid pressure to operate the dam aeration assembly.

4. The apparatus according to claim 1, further comprising a pump between the force main pipe and the water reservoir for drawing water from the water reservoir to the force main pipe.

5. The apparatus according to claim 1, wherein the force main pipe is positioned along the dam structure in direct communication with the water reservoir.

6. The apparatus according to claim 1, wherein the level of water pressure within the dam aeration assembly is between about 20 and about 25 pounds per square inch.

7. The apparatus according to claim 2, wherein the dam aeration assembly comprises a pipe inlet assembly coupled with the force main pipe and a header assembly coupled with the pipe inlet assembly at one end and coupled with the array of aerators at an opposing end, whereby water is directed from the force main pipe through the pipe inlet assembly to the header assembly.

8. The apparatus according to claim 6, wherein the dam aeration assembly comprises an outlet pipe whereby water flows from the array of aerators to the discharge waterway through the outlet pipe.

9. The apparatus according to claim 8, wherein the outlet pipe comprises a spillway for discharging overflow within the dam aeration assembly from the force main pipe to the discharge waterway.

10. The apparatus according to claim 7, wherein the pipe inlet assembly includes a first water delivery pipe in communication with the force main pipe for diverting water from the force main pipe.

11. The apparatus according to claim 10, wherein the pipe inlet assembly includes a directional valve for regulating fluid pressure between the force main pipe and the first water delivery pipe.

12. The apparatus according to claim 10, wherein the pipe inlet assembly comprises an elbow pipe in communication with the first water delivery pipe.

13. The apparatus according to claim 10, wherein the pipe inlet assembly comprises a second water delivery pipe in communication with the elbow pipe for directing water therethrough.

14. The apparatus according to claim 7, wherein the header assembly comprises a header pipe linked with the pipe inlet assembly.

15. The apparatus according to claim 13, wherein the header assembly comprises a header pipe linked with the second water delivery pipe.

16. The apparatus according to claim 14, wherein the header assembly comprises a header valve in cooperative engagement with the header pipe for regulating fluid pressure.

17. The apparatus according to claim 16, wherein the header assembly comprises a leader pipe linked with the header valve and with the array of aerators for distributing water from the pipe inlet assembly to the array of aerators.

18. A method for aerating water at dam sites including a water reservoir, a dam structure, and a discharge waterway whereby water from the reservoir passes through the dam structure and is introduced to the discharge waterway, comprising the steps of:

advancing water from the water reservoir through a force main pipe in communication with the water reservoir;

advancing the water from the force main pipe through a dam aeration assembly linked with the force main pipe;

aerating the water utilizing a dam aeration assembly; and discharging the water aerated by the dam aeration assembly into the discharge waterway.

19. The method according to claim 18, wherein the step of aerating the water utilizing the dam aeration assembly comprises advancing the water through an array of aerators.

20. The method according to claim 18, further comprising the step of generating a desired fluid pressure for the water, whereby the force main pipe extends generally downwardly from the dam structure toward the discharge waterway to generate the desired fluid pressure.

21. The method according to claim 18, further comprising the step of generating a desired fluid pressure for the water, whereby the force main pipe is positioned along the dam structure in direct communication with the reservoir to generate the desired fluid pressure.

22. The method according to claim 18, wherein the step of advancing the water from the force main pipe through a dam aeration assembly linked with a force main pipe comprises the steps of:

delivering the water from the force main pipe into a pipe inlet assembly of the dam aeration assembly;

delivering the water from the pipe inlet to a header assembly; and delivering the water from the header assembly to an array of aerators.

23. The method according to claim 22 further comprising the step of aerating the water via the array of aerators.

* * * * *